(No Model.) 3 Sheets—Sheet 1.
M. W. ILES.
DEVICE FOR CATCHING AND SAVING FUMES FROM METALLURGICAL FURNACES.
No. 484,017. Patented Oct. 11, 1892.
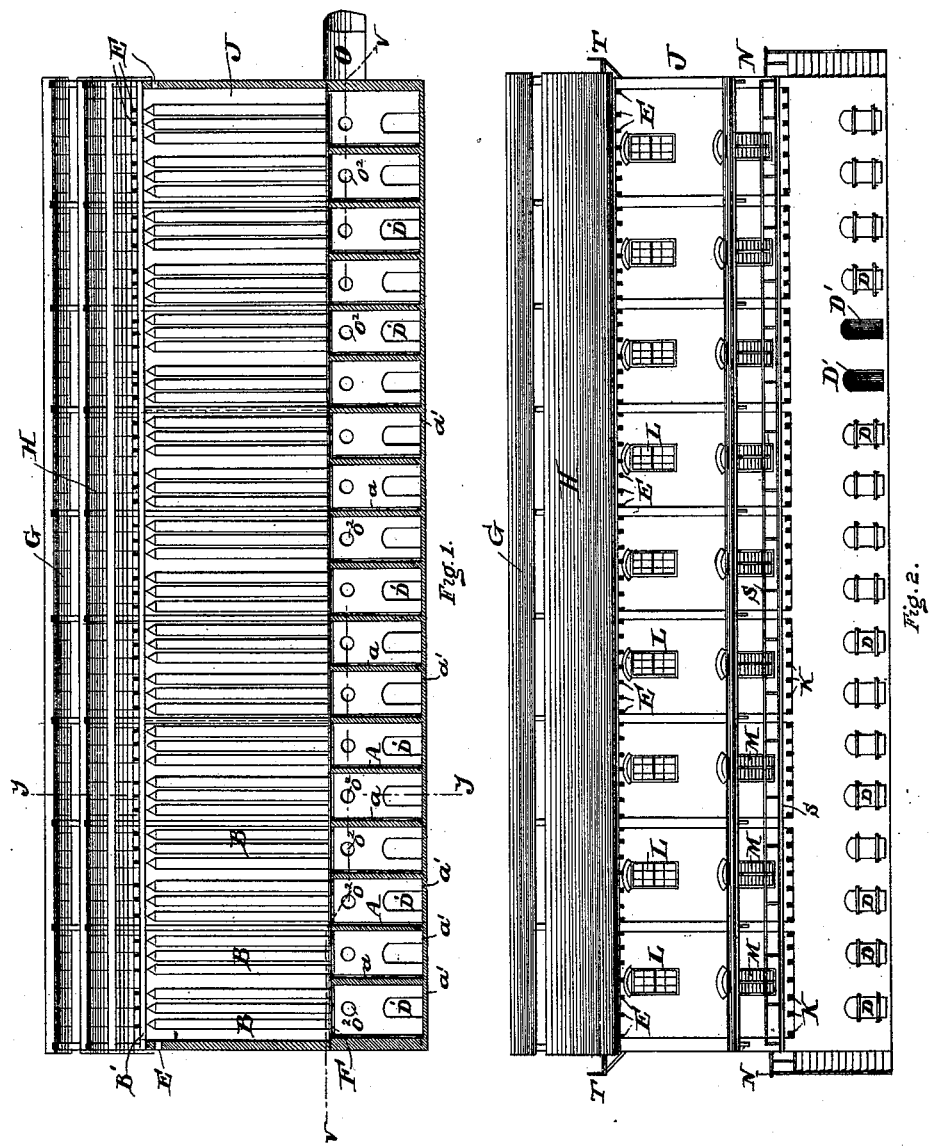

(No Model.)  3 Sheets—Sheet 2.
M. W. ILES.
DEVICE FOR CATCHING AND SAVING FUMES FROM METALLURGICAL FURNACES.
No. 484,017.  Patented Oct. 11, 1892.
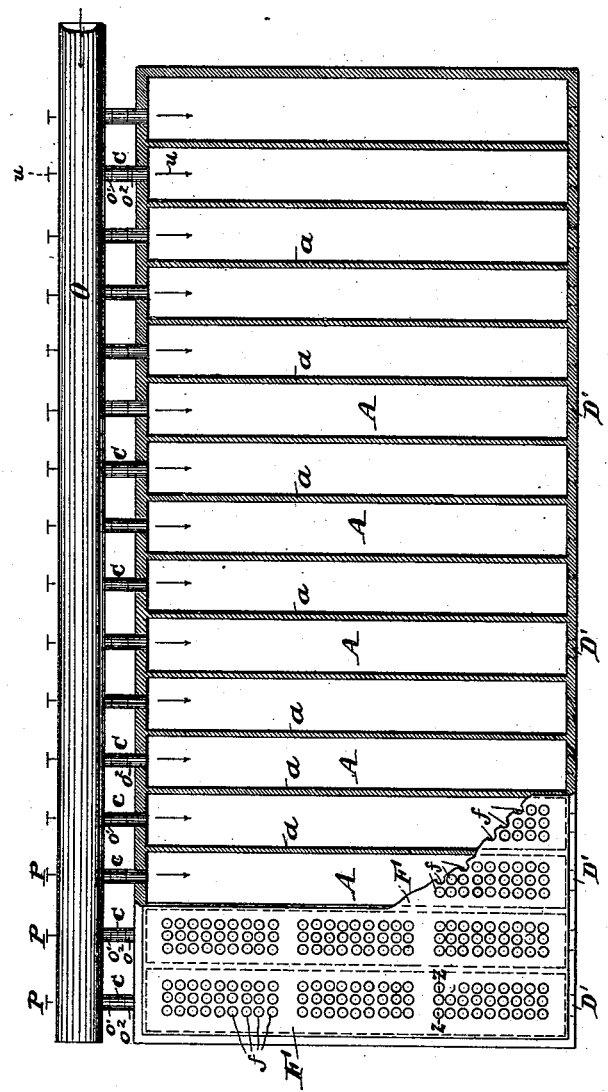
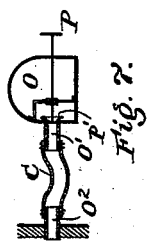
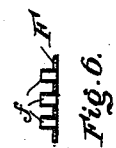
Witnesses
Geo. K. Fischer.
J. H. Tucker.
Malvern W. Iles, Inventor (No Model.) 3 Sheets—Sheet 3.

M. W. ILES.
DEVICE FOR CATCHING AND SAVING FUMES FROM METALLURGICAL FURNACES.

No. 484,017. Patented Oct. 11, 1892.

Witnesses
Geo. K. Fischer
J. H. Tucker

Malvern W. Iles, Inventor

UNITED STATES PATENT OFFICE.

MALVERN W. ILES, OF DENVER, COLORADO.

DEVICE FOR CATCHING AND SAVING FUMES FROM METALLURGICAL FURNACES.

SPECIFICATION forming part of Letters Patent No. 484,017, dated October 11, 1892.

Application filed February 6, 1892. Serial No. 420,612. (No model.)

*To all whom it may concern:*

Be it known that I, MALVERN W. ILES, of Denver, county of Arapahoe, State of Colorado, have invented a certain new and useful Improvement in Devices for Catching and Saving Fumes from Metallurgical Furnaces, of which the following is a true and exact description, reference being had to the accompanying drawings, which form a part of this specification.

My invention relates to the saving of the solid particles, consisting, mainly, of carbon and metallic fumes which are driven off from metallurgical furnaces in the process of smelting, roasting, &c. In this process the products of combustion are drawn by means of fans to a series of chambers and cooling-tubes, and when their temperature has fallen to a sufficiently-low point they are passed through screens, generally made in the form of bags, which permit the gaseous products of combustion to escape, while retaining the solid particles and metallic vapors. This "dust," as I may call it, is allowed to accumulate in or beneath the bags, and the accumulated mass is from time to time ignited, burning freely on account of the large amount of carbon and sulphur present, and under proper conditions the result of this burning is to agglomerate the mass, or, so to speak, "fuse it together" to such an extent that it can be readily handled and recharged into the furnace. This method, as applied to the saving of lead and the precious metals, is fully described in the well-known Lewis and Bartlett patents.

The object of my invention is to provide improved apparatus for carrying this process into effect, and the nature of my improvements will be best understood as described in connection with the drawings in which they are illustrated, and in which—

Figure 4:
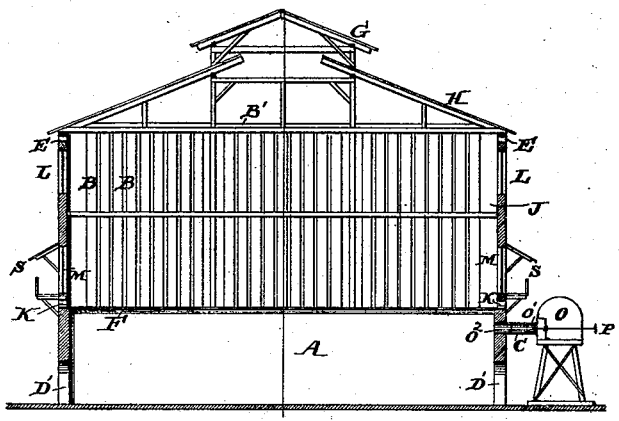
Figure 5:
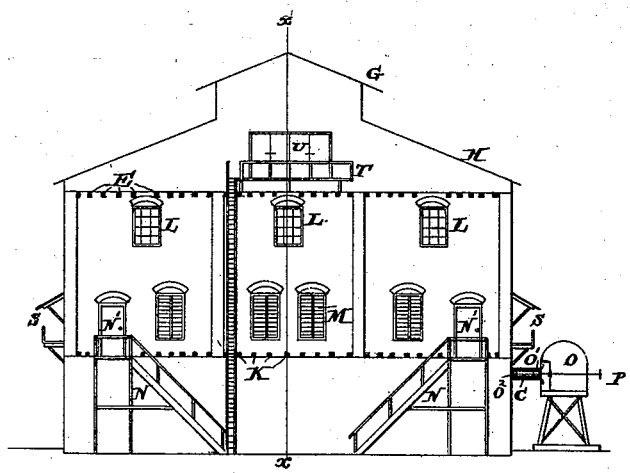
Figure 8:
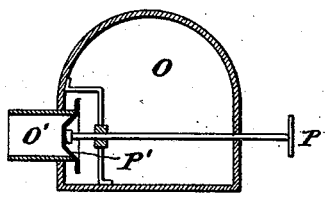

Figure 1 is a longitudinal vertical section through a building called the "bag-house," taken on the line $x\,x$ of Fig. 5. Fig. 2 is a side elevation of this bag-house; Fig. 3, a plan view taken on the line $v\,v$ of Fig. 1. Fig. 4 is a cross-sectional view through the bag-house, taken on the line $y\,y$ of Fig. 1; Fig. 5, an end view of the bag-house; Fig. 6, a cross-section of the floor of the bag-room, taken on the line $z\,z$ of Fig. 3. Fig. 7 is an enlarged elevation of the connection made between the smoke-main and the dust-chambers of the bag-house; and Fig. 8, a view on a larger scale, showing the arrangement of the valve for controlling the various delivery-pipes leading from the smoke-main.

The "lower part or story," so to speak, of the bag-house consists of a series of masonry chambers A A A, &c., having doorways D leading into them and tightly-closing doors or plates D for closing these doorways.

F is a sheet-iron partition or floor, which separates the chambers A from the bag-room J, situated above them, the said sheet-iron partition being pierced with holes, around each of which extends upward a thimble $f$. To these thimbles are secured the bottoms of the canvas or woolen bags B B, which are suspended from the top of the bag-house.

Immediately above the level of the floor or partition F a series of openings K K, &c., are formed through the walls of the bag-room for the purpose of permitting a constant and large supply of air to enter the bag-room on a level with the floor for the purpose of keeping the floor and the thimble $f$, to which the bags are attached, as cool as possible, thereby preventing the burning of the bags, which is naturally more apt to take place where they are in contact with hot metal.

Provision for thoroughly ventilating the bag-room and at the same time for preventing the entrance of water or dangerously-high wind must necessarily be made, and also provision for enabling the operators to regulate the draft as far as possible without entering the room, in which, of course, there is apt to be an accumulation of poisonous gases. As shown in my drawings, I provide a series of apertures or windows M M around the lower part of the bag-room, these windows being provided with slatted blinds, by adjusting which the amount of air admitted through them can be conveniently regulated. To enable these ventilators to be adjusted and permit the operators to examine the condition of the bags, I provide exterior galleries S S along the opposite sides of the room and on the outside thereof. Another row of ventilating-windows (indicated at L L, &c.) are provided near the top of the bag-room and at each end thereof. Doors U are also provided, the opening of which is effected from the gallery T, situated on the outside and reached by a ladder, as indicated.

N N are steps coming up to the doors M′, by which the operators enter the bag-room when necessary.

O indicates the smoke-main, or rather the extreme end of the smoke-main, through which the products of combustion are led from the furnaces. (Not shown in the drawings.) From this main O a series of delivery-pipes O′ lead, one or more for each of the dust-chambers A, and corresponding pipes $O^2$ pass through the walls of the chamber A and are connected with the pipes O′ by means of canvas tubes C. The opening of the delivery-pipes O′ is regulated by means of valves or dampers P′, working inside of the main O, and operated by means of rods P, which extend through the main and to the outside thereof, as indicated in the drawings.

In operation the smoke passes from the main O through the pipe O′, the canvas conduit C, and the pipe $O^2$ into each of the dust-chambers A, the doors D of which are tightly closed. From these chambers A the smoke passes through the thimbles $f$ into the bags B, which catch and retain the solid particles, permitting the gases to escape. The solid particles in turn fall from the bags into the chambers A and accumulate upon the bottoms thereof. When it is desired to ignite a mass of accumulated dust, the doors D are opened to admit a full supply of air, and the canvas tube C should also be disconnected from the pipe $O^2$. The dust, which is very inflammable, is then ignited without being in any way disturbed. The gases arising from this combustion can escape freely through the doorways D′ and the pipe $O^2$ and do not therefore pass up through the thimbles $f$ and into the bags. The walls $a$ of the chambers A being of masonry, do not communicate the heat from one chamber to another to a sufficient extent to ignite the dust in the adjoining chambers, and it will readily be seen that by the plan described one or more of the dust-chambers can be disconnected from the smoke-main and the accumulated dust burned without in any way interfering with the action of the other chambers and of the bag-room.

The described arrangement of the masonry dust-chambers A is of great practical importance, because by igniting the dust under the conditions described and made possible by the use of my particular construction I am enabled to obtain a proper fusion or agglomeration of the dust by ignition, this being found very difficult, if not impossible, where the dust is handled or in any way disturbed after it is deposited and before it is ignited.

The use of the canvas tube C as a part of the conduit from the smoke-main to a group of bags B is especially important, because in case the gases are hot enough to burn and destroy the bags, which is likely to occur in spite of the greatest precautions, they act first upon this canvas tube C and burn it away, the hot gases then escaping from the main O without passing to the bags, and by this simple device a great loss is effectually avoided.

Having now described my invention, what I claim as new, and desire to secure by Letters Patent, is—

1. A bag-house consisting of a lower story divided into a series of separate chambers A by masonry partitions and separated from an upper bag-room by a partition F, having perforations leading into each chamber A, in combination with a series of bags B, suspended in the bag-room and communicating with the chambers A through the perforated partition, an independent smoke-delivery pipe leading into each chamber A, and a series of doors D′, opening into each chamber A through the outer wall of the bag-house.

2. The combination of a smoke-conduit made of two separate and non-communicating incombustible parts, a connecting-section formed of combustible fabric, and a group of fabric screens communicating with said conduit, all substantially as and for the purpose specified.

3. The combination of a smoke-main O, a series of delivery-pipes O′, leading therefrom, a series of dust-chambers, as A, each communicating with a separate group of bags and each having a smoke-entrance pipe $O^2$, and combustible fabric tubes, as C, connecting the pipes O′ $O^2$, substantially as and for the purpose specified.

4. The combination of a series of dust-chambers communicating with a smoke-main O, a bag-room situated above said chambers and separated therefrom by a perforated partition or floor, said room having air-inlets K K, &c., situated in its sides substantially on the level of the floor, and air-exit openings at its top and a series of bags suspended therein and attached to the floor, all substantially as and for the purpose specified.

5. The combination of the smoke-main O, the delivery-pipes O′, leading therefrom, the series of valves P′, arranged to regulate the openings of pipes O′ and having operating-stems running through main O, a series of dust-chambers communicating with pipes O′, and a series of bags communicating with the dust-chambers, all substantially as and for the purpose specified.

MALVERN W. ILES.

Witnesses:
JOHN M. WALKER,
A. CHANUTE.